March 10, 1942.  D. R. BOONE  2,275,415
SOLDER WIPER MECHANISM
Filed March 7, 1939  2 Sheets-Sheet 1

INVENTOR.
Daniel R. Boone
BY Ivan D. Thornburgh
Charles H. Cruz
ATTORNEYS

March 10, 1942.         D. R. BOONE                2,275,415
SOLDER WIPER MECHANISM
Filed March 7, 1939                2 Sheets-Sheet 2
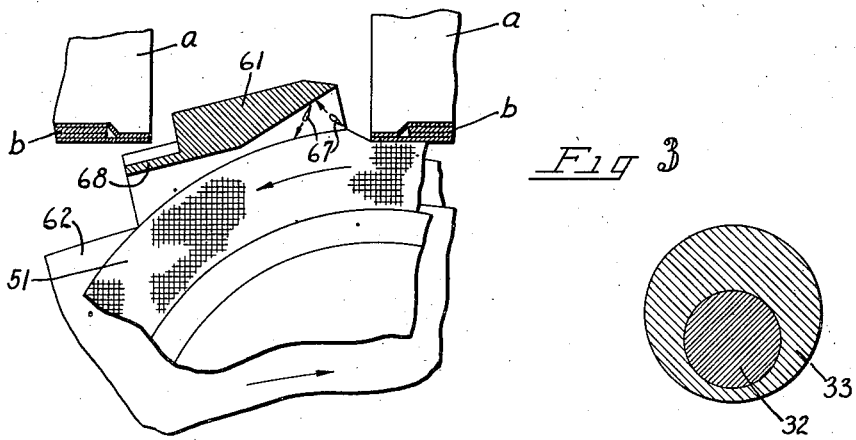
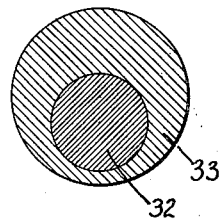
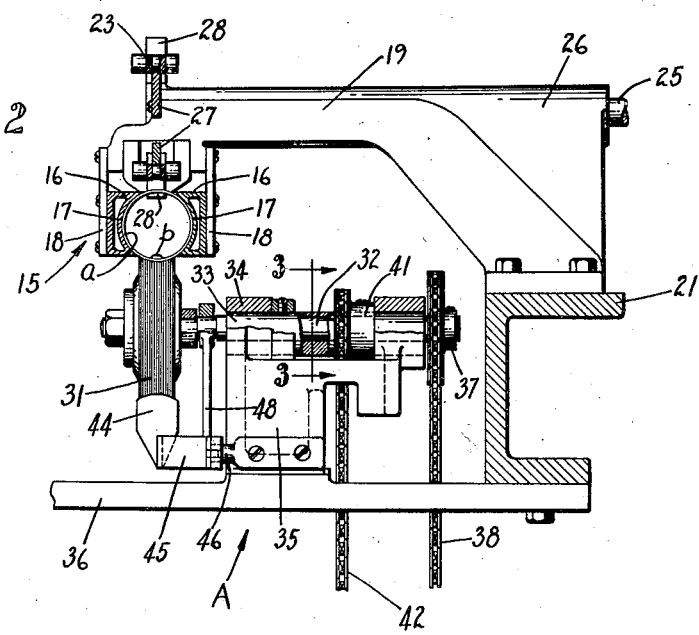
INVENTOR.
Daniel R. Boone
BY
ATTORNEYS Patented Mar. 10, 1942

2,275,415

UNITED STATES PATENT OFFICE 2,275,415

SOLDER WIPER MECHANISM

Daniel R. Boone, Portland, Oreg., assignor to American Can Company, New York, N. Y., a corporation of New Jersey Application March 7, 1939, Serial No. 260,400

5 Claims. (Cl. 113—97)

The present invention relates to a solder wiper mechanism for can body side seam soldering machines and has particular reference to auxiliary wiping of a predetermined portion only of a body side seam prior to or after and in addition to the regular wiping of the side seam.

In the usual wiping of side seams of cam bodies small solder pellets are sometimes thrown off the wiper and become attached to the inside surface of the bodies where they are not desired. Body shields or protector mechanisms have been devised to overcome this difficulty but it has been found that certain of these devices in order to properly shield the interior sometimes cover up the forward end of the body side seam to such an extent as to prevent this portion of the seam from receiving proper wiping. The finished seam at such an unwiped end thus carries an excess of solder which interferes with the proper flanging of the body and also interferes with the proper seaming of the can end to the body.

The instant invention contemplates overcoming these objections by providing an auxiliary wiper which will wipe only the forward end of the body side seam. It makes no difference, therefore, if this wiped end is previously or subsequently covered by a protecting shield or similar device when such is used during the regular wiping operation for even where performed in two stages the entire length of the seam is wiped.

An object, therefore, of the invention is the provision of a solder wiper mechanism for can body side seams wherein the entire seam is fully wiped even though a portion of the seam is covered over by shielding devices utilized for protecting the interior of the body against solder pellets during a regular wiping operation, that section of the seam so covered being independently wiped either before or after the regular wipe.

Another object is the provision of such a solder wiper mechanism in which the auxiliary wiping device is constantly rotated at high speed but which is so mounted as to only engage the forward end of the side seam of an advancing can body so that only that portion of the seam will be wiped free of excess solder by such auxiliary device.

Another object is the provision of a solder wiper mechanism of this character wherein the auxiliary wiper device is positively shifted relative to the can bodies and in time with the travel of the bodies so that a predetermined portion of each of many can bodies moving in a continuous procession will be wiped free of excess solder.

Numerous other objects and advantages of the invention will be apparent as it is better understood from the following description, which, taken in connection with the accompanying drawings, discloses a preferred embodiment thereof.

Referring to the drawings:

Fig. 2 is a transverse sectional view taken substantially along the line 2—2 in Fig. 1;

Fig. 3 is an enlarged sectional detail taken substantially along the line 3—3 in Fig. 2; and Fig. 4 is a fragmentary side detail on an enlarged scale of one of the shields used in the conventional cam body protecting device shown in Fig. 1; the shield being shown in section and in a position to prevent solder thrown off by the wiper from entering a wiped can body.

Figure 1:
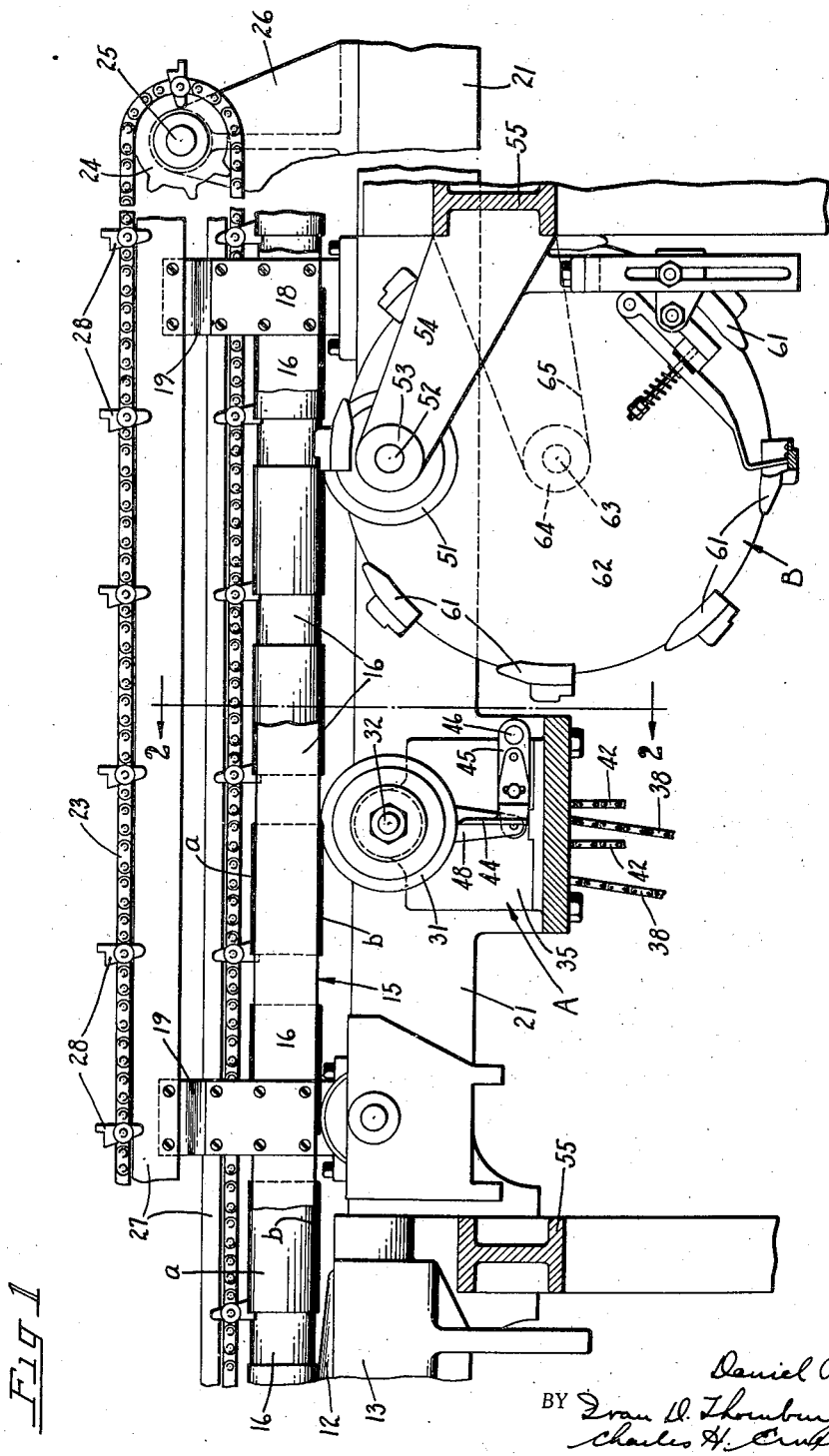
Figure 1 is a side elevation of the wiper section of a soldering machine embodying the instant invention, parts of the machine being broken away and other parts shown in section.

As a preferred embodiment of the invention the drawings illustrate the wiper section of a can soldering machine in which open end can bodies $a$ (Fig. 1) having longitudinal side seams $b$ are first soldered by a suitable soldering mechanism such as, for example, a usual solder roll 12 which is rotated in any suitable manner in a solder bath 13.

The can bodies are preferably moved in a continuous procession in a straight line longitudinally of the solder roll and are passed from the solder roll first through an auxiliary wiper device A where excess solder is wiped from only the forward end of the side seams. In this embodiment the can body is then further advanced past a regular or master wiping device B which wipes the remainder or unwiped portion of the side seam.

The auxiliary wiper device A could be located after the master wiping device B, if such a location was desirable for any reason and obviously the same beneficial wiping results would obtain.

During advancement of the can bodies past these solder and wiping devices they are supported in a suitable horn 15 (Figs. 1 and 2) which includes a pair of spaced and parallel hollow guide bars 16 having curved inner faces 17. It is these curved faces which support the bodies $a$ and at the same time they maintain the roundness of the bodies. The horn bars 16 are secured to side plates 18 which are bolted to overhanging brackets 19 mounted on a main frame 21 of the soldering machine. There are a plurality of these brackets 19 disposed at spaced intervals along the length of the machine.

The can bodies are propelled along the horn 15 by a continuously moving endless chain conveyor 23 which extends the full length of the machine and is actuated in any suitable manner. At the wiper end of the machine the chain takes over an idler sprocket 24 which is mounted on a shaft 25 carried in a bracket 26 bolted to the top of the main frame 21.

The conveyor chain is suitably supported between the sprockets by runways 27 which are bolted to the overhanging brackets 19. Feed dogs 28 secured to the chain at equally spaced intervals along its length are provided to engage behind the rear edges of the can bodies a and it is these chain carried dogs which propel the bodies along the horn in spaced relation.

The auxiliary wiper device A in the position shown in the drawings is located under the horn 15 and adjacent the solder bath 13. The auxiliary wiper device includes a cloth wiper wheel 31 (Figs. 1 and 2) which is mounted on one end of a horizontal shaft 32 carried in an eccentric sleeve 33 (see also Fig. 3) journaled in bearings 34 of a bracket 35 mounted on a base plate 36 bolted to the main frame 21. The wiper wheel is rapidly rotated in a direction opposite to the direction of travel of the cans along the horn 15 by a sprocket 37 which is mounted on the outer end of the shaft 32. This sprocket is driven by a chain 38 which is operated in any suitable manner from a source of power.

While the wiper wheel 31 is thus rapidly rotated it is moved toward and away from the horn 15 in time with the passage of the can bodies therealong. For this purpose the sleeve 33 is rotated by a sprocket 41 which is driven by a chain 42 actuated from any suitable source of power but in time with the movement of can bodies along the horn.

Thus when the forward end of the side seam of a can body in the horn 15 approaches the auxiliary wiper wheel 31, the latter moves up into momentary engagement with it and thus wipes the excess solder from that predetermined portion of the seam. The wiper wheel does not remain in contact with the can body but immediately moves clear of the body so that only the forward end of the seam for a short distance is wiped. It has been found that a wiped distance of about three-eighths of an inch is sufficient for best results. The short time that the wheel is in contact with the body therefore prevents throwing of solder pellets from this wheel into the body.

Solder accumulated on the auxiliary wiper wheel 31 is removed by a scraper 44 (Figs. 1 and 2) which at all times engages against the circumference of the wheel. The scraper is adjustably secured to a lever 45 which is mounted on a pivot bracket 46 bolted to the bearing bracket 35. The inner end of the lever is connected to a link 48. The upper end of this link surounds the wiper wheel shaft 32 and hence as the wheel is shifted by the eccentric sleeve 33 relative to the horn, the link rocks the lever in time therewith and thus maintains the scraper in constant contact with the wheel.

The master wiping device B which may be used for wiping the major part of the side seam of the can bodies a is located adjacent the auxiliary wiper device A. This master wiping device B is of usual construction and comprises a cloth wiper wheel 51 (Fig. 1) mounted for rotation on a shaft 52 journaled in bearings 53 formed in bracket arms 54 of a frame cross-beam 55 of the main frame 21. The wheel shaft is rotated in any suitable manner in a direction opposite to that of the travel of the cans along the horn.

To prevent solder pellets from the wiping wheel 51 from entering the interior of the can bodies moving along the horn, shields 61 are provided and are adapted to be placed in position between the open ends of the moving can bodies during the regular wiping of the major portion of the body side seams. These shields are disposed in spaced relation around the periphery of a rotating disc 62 which is carried on a short shaft 63 journaled in a bearing 64 formed in a bracket arm 65 of the frame cross-beam 55. The disc is rotated by any suitable means in time with the passage of can bodies along the horn 15, but in a direction opposite to the rotation of the wiper wheel 51.

This style of wiping device B is more fully disclosed and explained in the Custis S. Woolford United States Patent Number 2,161,839, issued June 13, 1939.

As a pre-wiped can body a in the case of an embodiment having the auxiliary wiper device A in front, approaches the master wiping wheel 51, the rotating disc 62 brings a shield 61 into position between the approaching body and the preceding body which has just been fully wiped. This shield closes off the open space between the bodies just mentioned so that any pellets of solder which may be thrown off by the rapidly rotating wiper wheel 51 will be blocked from entering the can bodies. Fig. 4 illustrates such a shield being brought into position and illustrates how these solder pellets, indicated by the numeral 67, strike against the bottom surface of the shield and bounce or are deflected back onto the wheel.

For best results it has been found that the shield should partly overlap the forward end of the seam of the approaching body and accordingly the shield is formed with a stepped portion 68 which engages over this part of the seam during the regular wiping operation.

It is this portion of the seam which has been pre-wiped by the auxiliary wiper wheel 31 in the case under consideration. In the case of the auxiliary solder wiper A being positioned after the main wiper B, this unwiped end would be wiped off after the can body left the main wiper, the shield 61 shielding this unwiped section instead of shielding a wiped part.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A solder wiping mechanism for soldering machines, comprising in combination: feeding devices for advancing along a path of travel can bodies having soldered side seams, an auxiliary wiper device adjacent said path of travel, means for shifting said wiper device into and out of engagement with the side seam of the passing can bodies in time with the movement of the latter, said shifting of said auxiliary wiper device being adapted to remove excess solder from the forward portion of less than the full length of the seam of each body, a master wiping device also disposed in the path of travel of the can bodies and operative in the same plane as said auxiliary wiper device for removing excess solder from the trailing portion of the body side seams left unwiped by said auxiliary wiper device, and means cooperating with said master wiping device for shielding the interior of the cans against the entrance of wiped solder thereinto.

2. A solder wiping mechanism for soldering machines, comprising in combination: feeding devices for advancing a can body having a soldered side seam along a path of travel, a master wiping device for removing excess solder from a major portion of the body side seam, means cooperating with said wiping device for shielding the interior of the cans against the entrance of wiped solder thereinto, an auxiliary wiping device disposed adjacent said path of travel for removing excess solder from a remaining minor portion of said side seam, and cam actuated means for shifting said auxiliary wiping device into and out of wiping engagement with the said passing can body in time with the movement of the latter to insure removal of excess solder from that portion of the side seam not previously wiped by said master wiping device.

3. A solder wiping mechanism for soldering machines, comprising feeding devices for advancing can bodies having soldered side seams along a line of travel, a wiper located adjacent said line of travel and having engagement with the side seams of said passing can bodies during their advancement for wiping their soldered seams, means for shielding said wiper to prevent throwing of solder and other foreign matter into said passing can bodies, said shielding means being formed to block off the forward end of the side seam of each can body during the wiping action to prevent spattering of the solder from the wiper and into the interior of the bodies, an auxiliary wiping device disposed in spaced relation to said first mentioned wiper for wiping excess solder from that portion of the body side seams blocked off by said shield against engagement by said first mentioned wiper, and means for moving said auxiliary wiping device into and out of engagement with a portion only of the soldered side seams of successive can bodies in time with the advancement of the latter by said feeding devices.

4. A solder wiping mechanism for soldering machines, comprising in combination with feeding devices for advancing can bodies having soldered side seams, a master wiping device for removing excess solder from a portion only of said seams, means cooperating with said wiping device for shielding the interior of the cans against the entrance of solder thereinto, a rotatable wiper wheel also disposed adjacent the path of travel of said can bodies and adapted to remove excess solder from such portions of the seams which are not contacted and wiped by said master wiping device, a rotatable auxiliary eccentric mounting for said wheel, and means for rotating said mounting in time with the advancement of said bodies whereby to shift said wiper wheel into engagement with the side seams of said auxiliary advancing bodies for removing excess solder from a predetermined portion of said side seams.

5. In a solder wiping mechanism for soldering machines having feeding devices for advancing can bodies having soldered side seams, the combination of a main solder wiper device adjacent the path of travel of said cans, said main solder wiper device including means for shielding the interior of passing cans against the entrance of wiped solder thereinto, an auxiliary solder wiping device disposed in the path of the advancing can bodies and spaced from said main solder wiper device, and means for shifting said auxiliary wiper device into and out of engagement with the side seam of the passing can bodies in time with the passage of the latter, said auxiliary wiper device being adapted to remove excess solder from the forward portion of a side seam and said main solder wiping device being adapted to remove excess solder from the remaining trailing portion of said side seam.

DANIEL R. BOONE.